INVENTORS:
Tom Nuttall
Sydney Alfred Shorter
BY: Reeg, Bayer & Bakelar
ATTORNEYS.

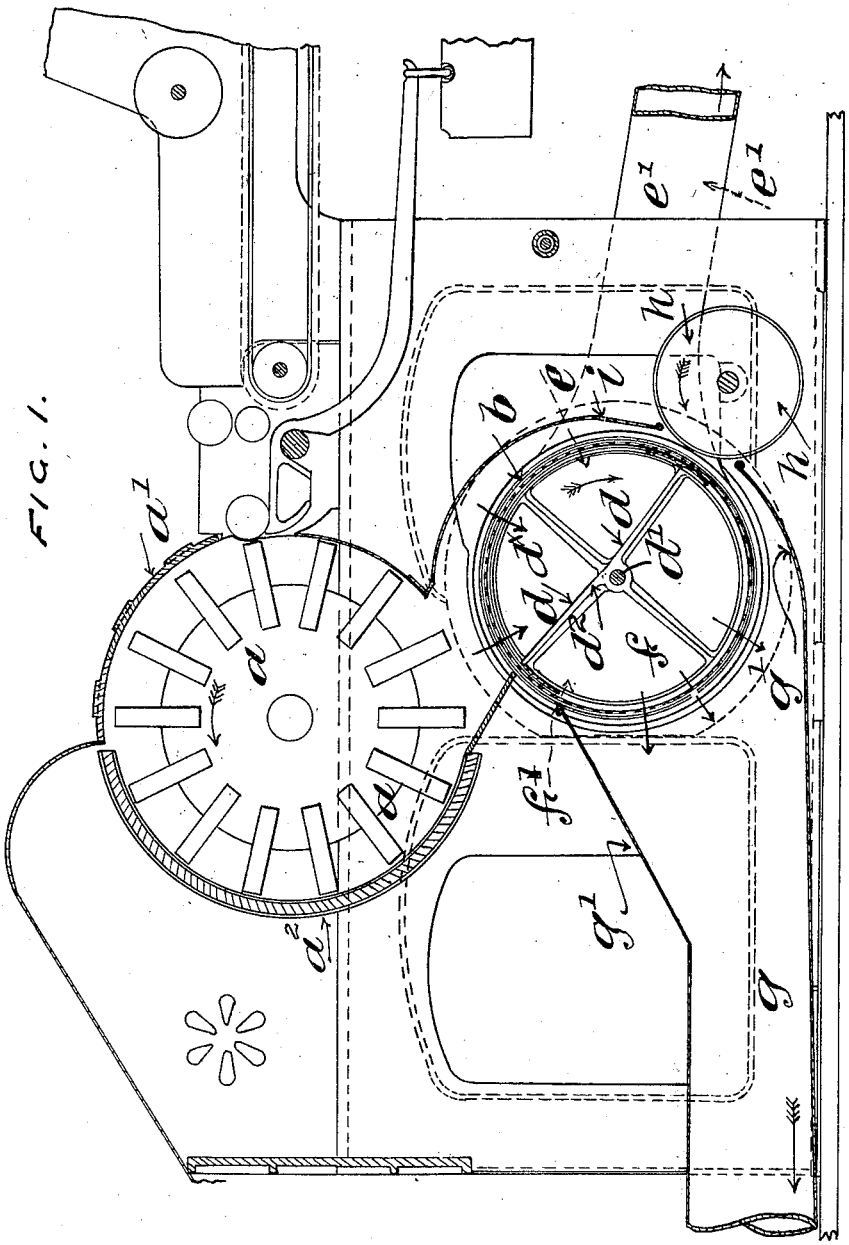

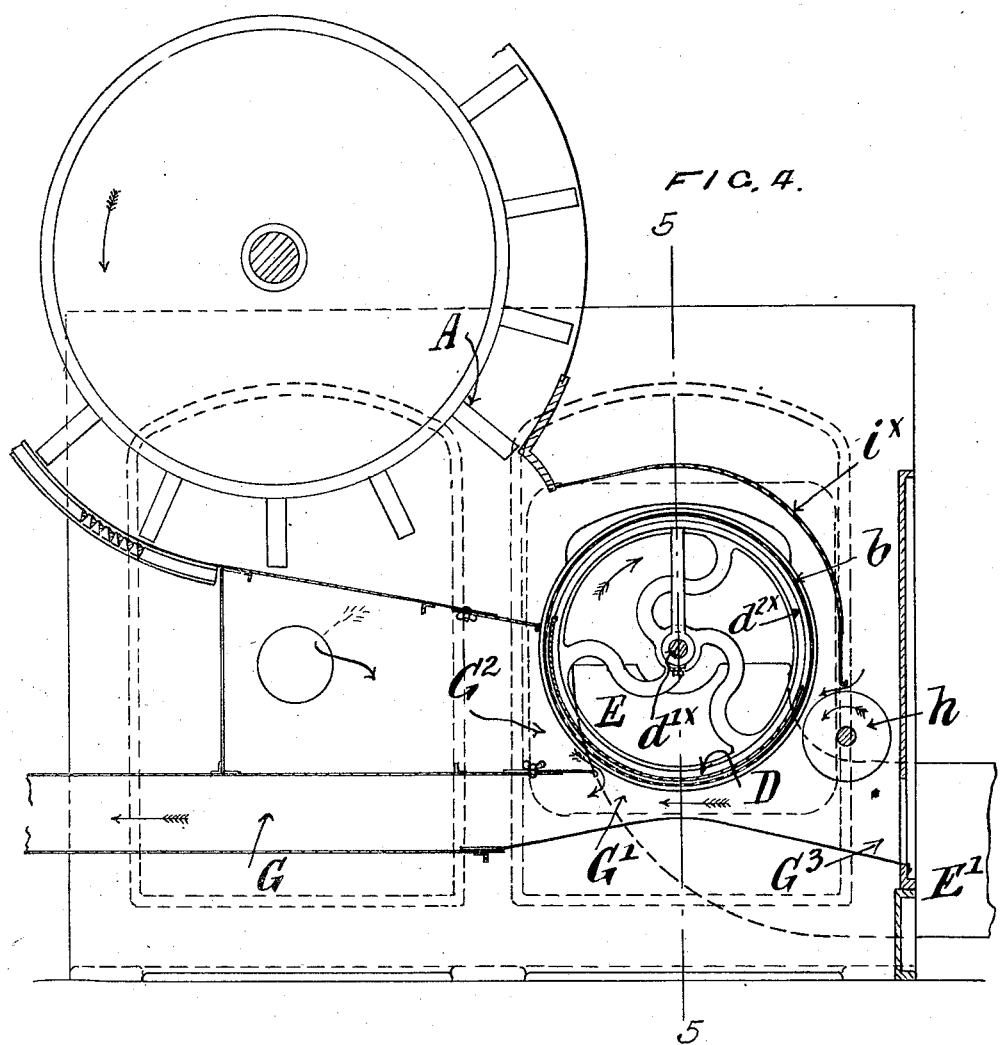

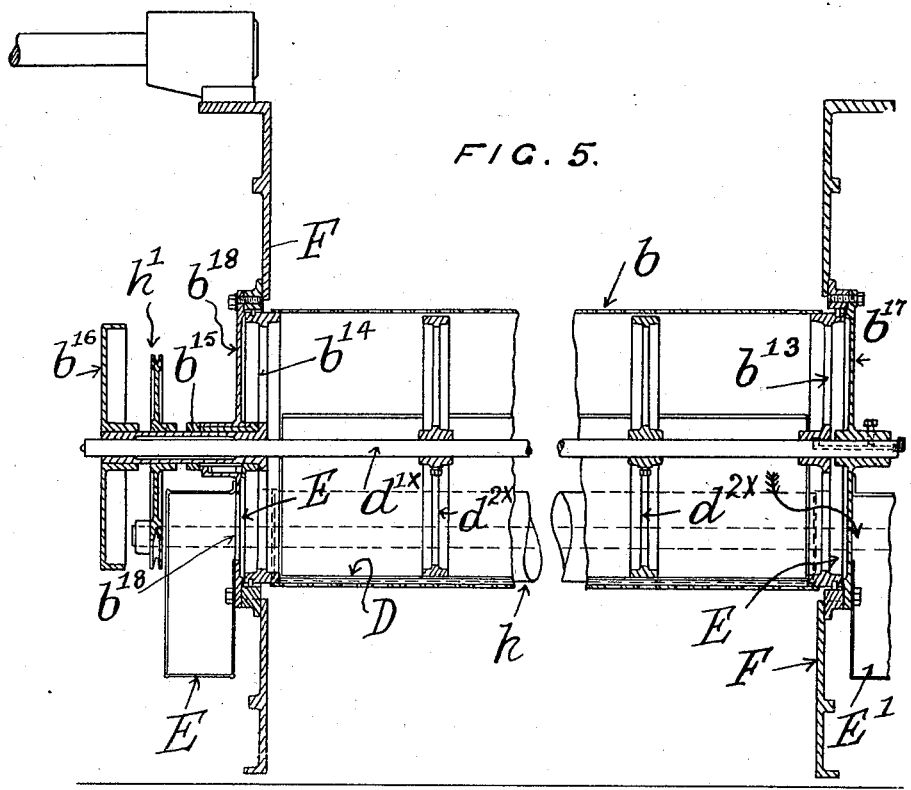

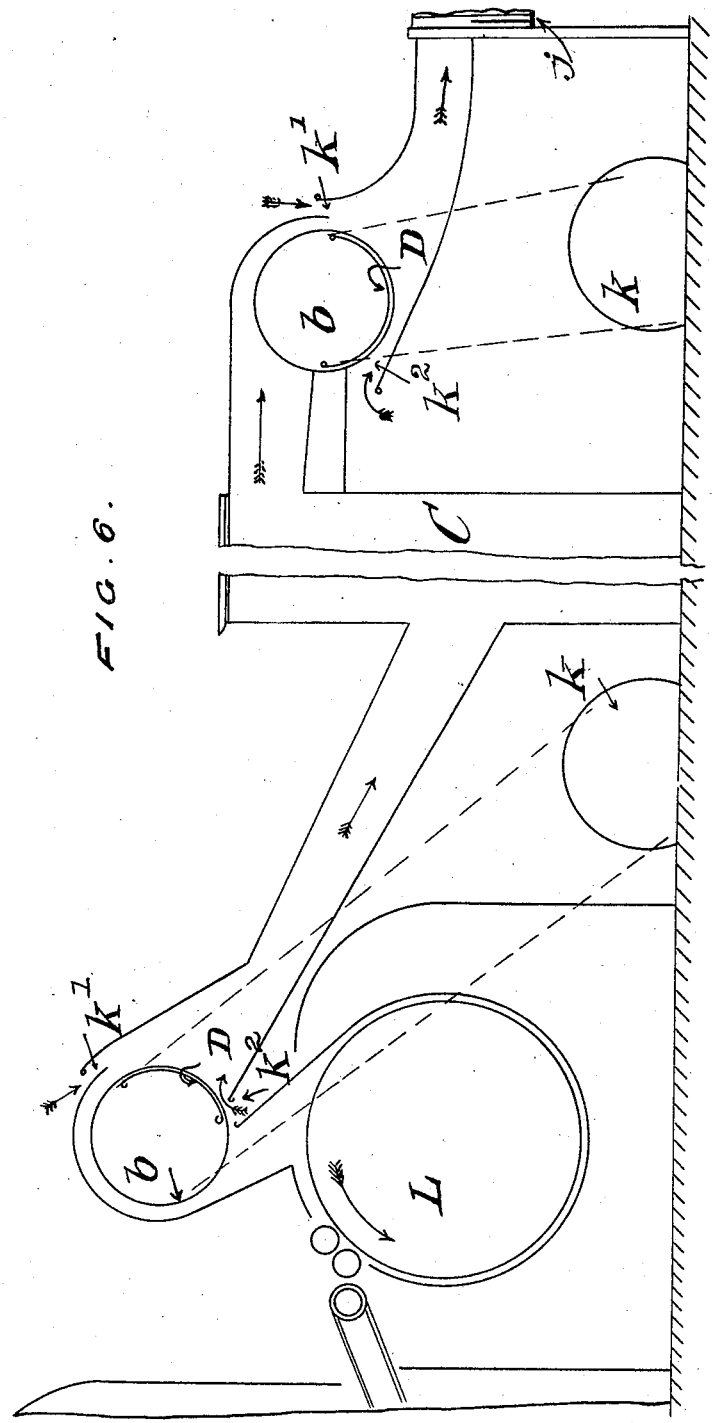

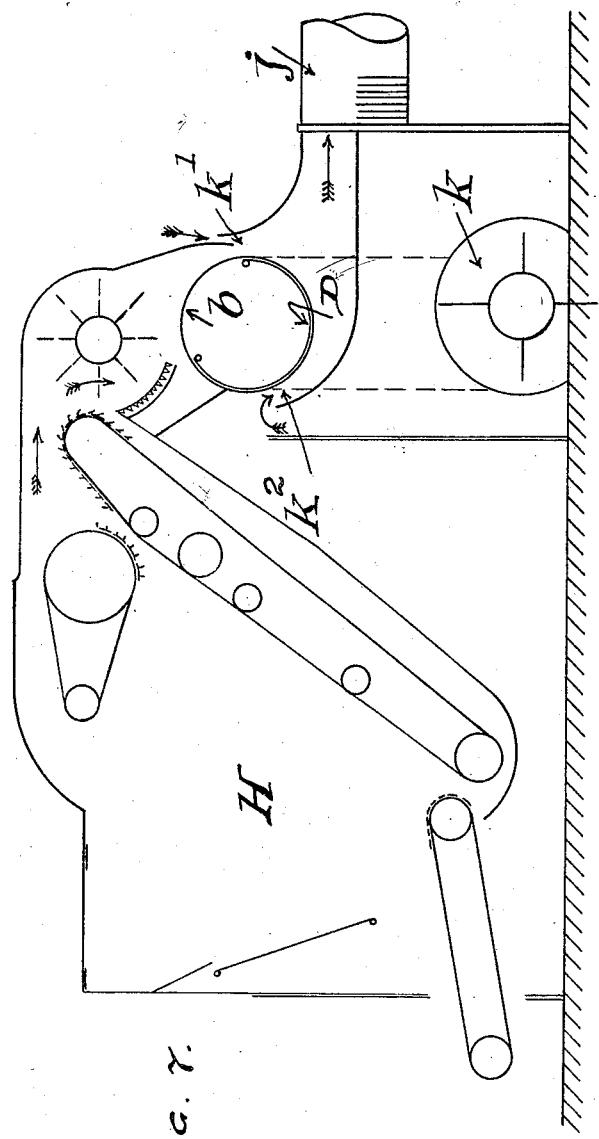

Patented June 16, 1931

1,810,675

UNITED STATES PATENT OFFICE

TOM NUTTALL, OF FARNWORTH, NEAR BOLTON, AND SYDNEY ALFRED SHORTER, OF DIDSBURY, MANCHESTER, ENGLAND, ASSIGNORS OF ONE-THIRD TO THE BRITISH COTTON INDUSTRY RESEARCH ASSOCIATION, OF MANCHESTER, ENGLAND, A BRITISH ASSOCIATION

OPENING, MIXING, BLOWING ROOM, AND LIKE MACHINERY USED IN COTTON MILLS

Application filed June 11, 1929, Serial No. 370,077, and in Great Britain July 3, 1928.

This invention relates to improvements in or connected with opening machinery, pneumatic mixing apparatus, blowing room and cleaning machinery and such like, used in cotton mills. It concerns the provision and use of high speed dust cages or additional dust cages in such apparatus, said cages being appropriately located where the cotton passes in a thin open or attenuated condition, said cages being driven to ensure a high surface speed. The principle involved is to attack the cotton passing through the indicated machines, or between grouped machines, and where the fleece is thin or attenuated, and there to provide means by which the dust, etc., can be readily extracted and permanently removed from the apparatus, the simplest means being high speed dust cages or their equivalent.

Dust cages are well known as collectors of cotton in its passage through various types of machines the same acting to collect and deliver the fleece or web. The surface speed of the known dust cages is slow and the amount collected considerable in thickness and weight. According to the known schemes, the very thickness of the cotton on the surface of the cage has militated against the extraction of dust etc., through the openwork periphery. Now we propose, appropriately to locate a dust cage or cages, where the passing fleece is in a very open condition in such machines, whereby the dust etc. can be effectively acted on and removed by the air suction, the fibre being passed on by clean air forward from the provided high speed dust cages. These high speed dust cages are provided with suitable devices for facilitating the removal of the cotton adhering to the openwork periphery, such removal being either merely temporary for the purpose of releasing entangled dust and followed by a replacement of the cotton on the aforesaid periphery, or being permanent and resulting in the transference of the cotton to another cage, or to a dust trunk or to such appliances as appropriately follow the aforesaid high speed dust cage. Such devices may consist of suitably designed dampers or partitions dividing the interior of the cage into two or more portions connected either with the usual type of suction fan thus causing the cotton to approach or adhere to the corresponding portion of the periphery of the cage, or connecting to the outside atmosphere thus causing, with appropriate arrangement of the outer casing of the cage or cages, a current of air from the inside to the outside of the corresponding portion of the periphery of the cage, and consequent removal of the cotton. For example, we may provide a damper arranged diametrically or segmentally in the cage (and adjustable angularly if desired) there being suction on the one section of the cage to permanently remove dust and dirt, while the remaining portion of the cage is open to atmosphere whereby cotton resting on such half of the cage is instantly displaced by the incoming clean air from atmosphere and liberated ready to be carried forward or acted upon.

The location of the suction or blowing areas of the cage could be varied.

We may provide a multiple arrangement of separated dampers with the high speed cage or cages, say two or more fixed or movable dampers so that there is alternate suction and blowing available over various areas of the cage or cages as such an arrangement would allow of a certain disturbance of the cotton if necessary before actual removal, but we do not consider such to be necessary.

In any of the examples, we may provide additional co-operating devices such as ordinary slow running dust cages, stripper rollers, beaters, closing or separating rollers, flappers, or such like, working with or adjacent to the high speed cage or cages.

In order to better disclose the principle involved in the providing and working of a high speed dust cage or cages for the purpose of attacking cotton during the time it is actually being transmitted from or through opening and like apparatus, and while in a very thin or attenuated condition, we propose to describe several arrangements by way of examples and these arrangements are illustrated by the drawings. It is to be recognized that we utilize what are, in effect, high speed dust cages for the purpose of serving in sequence as rotary filter screens and then as surfaces which the fibre (already acted on) leaves automatically. Through the rotary filter screen area, for the time being, goes the dust and dirt laden air which leaves the machine for good, while fresh or clean air conducts the fibre (which has been treated) onwards from the area which for the time being has ceased to be a rotary filter screen and is a delivering up area. Thus a high speed dust cage becomes effective to operate automatically as an efficient filtering screen and as a cotton liberating area for the object in view, that is, permanently getting rid of much dust and dirt so that treated cotton is carried onwards to subsequent apparatus by clean air, the dirty air being constantly discharged.

In the accompanying drawings:

Fig. 1 is a broken sectional elevation (on the line 1—1 Fig. 2) showing the application of an arrangement according to our invention to a porcupine opener of well known construction, only so much of the apparatus being shown as will suffice for a proper explanation.

Fig. 4 shows the application in accordance with our invention of a high speed dust cage in connection with an interposed horizontal cylinder opener in a group of apparatus or otherwise.

Fig. 5 is a vertical cross section on the centre line 5—5 of the high speed dust cage Fig. 4.

Fig. 6 shows our improvements applied to a group of machines including a beater of the horizontal duplex type and a vertical opener with a discharge pipe of the type commonly known in the trade as a D trunk.

Fig. 7 shows the improvements applied between a hopper feeder and a discharge pipe similar to that shown in Fig. 6.

Figure 3:
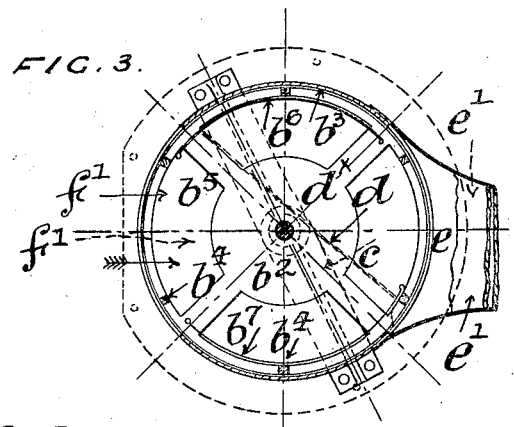
Fig. 3 is a section on the line 3—3 of Fig. 2.
Figure 2:
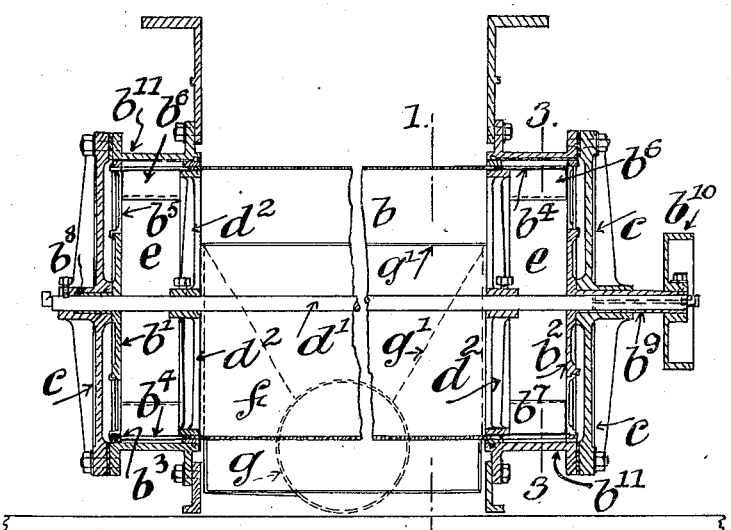
Fig. 2 shows a cross-section through the centre of the high speed dust cage Fig. 1.
Figure 2A:
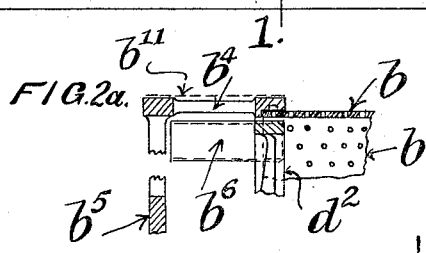
Fig. 2a is a detail view.

Referring first to Figs. 1 to 3, we there show a porcupine opener $a$ with its casing $a^1$ and its dirt bars $a^2$, and which porcupine opener is fed in any known fashion, the porcupine opener being the beginning or intermediate part of any suitable group of interconnected machines. Below the opener $a$ we locate a revolvable high speed dust cage $b$ which is a perforated sheet metal or wire work cylinder, akin to the known dust cages, its effective length being perforated or open-work.

This cylindrical cage $b$ is carried on removable end structures or spiders $b^1$, $b^2$ with outer rings $b^3$ having lateral bars $b^4$ upon which the open-work cage $b$ is carried, so that, the cage structure is a complete revolvable entity. The end structures or spiders $b^1$, $b^2$ may be solid, or may have glass or other panels $b^5$.

Short upper and lower dampers $b^6$, $b^7$, are fitted top and bottom, of a width just exceeding the length of the lateral bars $b^4$, these dampers $b^6$, $b^7$, being carried on the supports for the main damper to be later explained.

The end structure $b^1$ has a sleeve-like extension $b^8$, and end structure $b^2$ has also a sleeve-like extension $b^9$ upon which is a pulley $b^{10}$ by which to drive the complete high speed dust cage $b$. The sleeve-like extensions $b^8$ and $b^9$ fit in long sleeved bored bosses of bridge pieces or radial stays $c$ bolted to cylindrical extensions $b^{11}$ secured to the frame sides, as Fig. 2 shows.

The sleeve-like extensions $b^8$ and $b^9$ rotate about a fixed shaft $d^1$ upon which are pinned the spider arms $d^2$ which carry, as well as the short width upper dampers $b^6$ and $b^7$, the main radial damper $d$.

The main radial damper $d$ roughly divides the interior of the high speed dust cage $b$ into two equal sections, and, it can be set by angular adjustment through a reasonable number of degrees, and there may be small circumferential segments to the damper as shown.

The upper interior half $d^x$ of the high speed dust cage $b$ communicates, by passages end-on right and left from the centre, with end compartments $e$ the external walls of which are the end structures or spiders marked $b^1$, $b^2$ (see Figs. 2 and 3) and, as between the perforated structure of the high speed dust cage $b$ and the end structures or spiders marked $b^1$, $b^2$ the lateral bars $b^4$ appertain, it is clear that dust and dirt drawn through what is the upper-half of the high speed cage $b$ for the time being, can be sucked away along the dirty air ducts $e^1$, which are placed in communication with a fan or fans.

Similarly, it is seen that clean air from the atmosphere enters through the two apertures at $f^1$, in the cylinder extensions $b^{11}$ and passes to the lower interior $f$ (or, that part of the area of the high speed dust cage $b$ below the main damper $d$) and is drawn through the interstices by the suction of a fan or fans so as to remove the fibre and couple-up or convey the fibre to the D-shaped pipe line commonly known as the D trunk which leads to the known slow running collecting or condensing cages. The sheet metal walls $g^1$ cover the under portion of the open-work length of the high-speed dust cages $b$ over the delivery area, these converging into the leading away tube $g$, the sheet metal walls $g^1$ fitting up to the release area of the high speed dust cage $b$ and constituting a sort of trumpet mouth. It is apparent that, clean air from the atmosphere transports the cotton and carries it forward to the ordinary slow-running dust cages or whatever arrangement receives the fibre. There may be applied a dividing or closing roller, marked $h$, running at the same surface speed as the high speed dust cage $b$ and applied as shown just below the cover plate $i$ which encloses the upper area of the high speed dust cage $b$.

In Figs. 4 and 5, a modified arrangement is shown in connection with an opener of the horizontal cylinder type as part of a group of apparatus for opening and conveying cotton and in this example, the high speed dust cage $b$ is mounted on end structures $b^{13}$, $b^{14}$. In this case, $b^{13}$ is loose on the stationary shaft $d^{1x}$ while $b^{14}$ combines a long sleeve $b^{15}$ upon which the driving pulley $b^{16}$ is fixed. Thus, the high speed dust cage $b$ can be driven. On the stationary shaft $d^{1x}$ are fixed the rings or pulley-like hoops $d^{2x}$ which support the damper D, which, in this case, is semi-circular in cross-section. There are circular end structures $b^{17}$, $b^{18}$, bolted to the frame sides F, F, for the ends of the high speed cage $b$ to rotate to, and the lower parts thereof have outlet apertures E, E which lead into two lateral exhaust ducts or conducting tubes $E^1$, $E^1$ which are coupled to a fan or fans and convey dust and dirt from the inside of the high speed dust cage. The segmental damper D shuts off the air suction from the interior of the cage $b$ to the mouth piece $G^1$ and to the trumpet mouth $G^2$ and the tube G, and cotton on the lower area of the high speed dust cage is at once released. This released cotton is collected into and conducted along the duct G which has a mouth sufficiently covering the release area of the high speed dust cage, and a suction from the known fan or fans is exercised on the duct G which takes in clean air at the points $G^2$ and $G^3$, and so, clean air conveys the cotton along the duct G. The beater A projects the cotton, in a finely attenuated form, over the upper part of the high speed dust cage $b$, and a closing roller $h$ may be used driven by a crossed band from the pulley $h^1$. The upper part of the high speed cage is enclosed by a well fitting removable cover $i^x$ to produce a suitable channel for the passage of the cotton fibre.

In the example Fig. 6 we show a high speed dust cage arranged between a beater of the horizontal duplex type and an opener of the vertical type such for instance as shown in the Creighton Patent No. 440,221, and between the latter opener and the D-shape pipes. The horizontal duplex opener is marked L, the vertical opener C, and the D-shaped pipe $j$.

The high speed dust cages are marked $b$, and the dampers D, and the dust and dirt passing into $b$ is taken right out as explained by the action of fans $k$. Fresh air is admitted at the points $k^1$ and $k^2$ and so the other and known fan or fans drawing the cotton from the area of the cage covered by the damper D is making use of clean air to convey the cotton.

In Fig. 7 a hopper feeder H is shown feeding to a D-shaped pipe marked $j$, and in this case, a high speed dust cage $b$ is interposed in the group with its damper D and fan $k$ to permanently remove dust and dirt from $b$ as explained. Fresh air for conveying the fibre from the damped area of the high speed cage $b$ enters at the points $k^1$, $k^2$ due to the fans which draw the fibre along the pipe $j$.

As, under our invention, the cages $b$ are high speed cages constantly offering a fresh filtering area constantly kept clean by a provided air suction system it is necessary to run same at a relatively high speed and this we do, the cages $b$ being run at say 100 to 400 revolutions per minute, as against a speed of 10 to 20 revolutions per minute which is about the normal speed of ordinary dust cages.

We declare that what we claim is:

1. Means for the opening and cleaning treatment of cotton comprising a beater device, a dust cage capable of being driven at a high speed, a casing between the beater device and the high speed dust cage, an enclosure for the said dust cage, a damper located in said dust cage, outlets for the dust and dirt in the dust cage enclosure to cause the dust and dirt to travel laterally along the interior of the cage, suction provision for extracting the dirty air which leaves the dust cage for good, a cotton receiving conduit outside the dust cage and below the dampered section of the cage, clean air inlet provision to the cotton receiving conduit and means to exert a suction on the cotton receiving conduit so as to continue the carriage of the cotton in clean air, the dirty air being conveyed out of the dust cage and the cotton liberated to the clean air conduit.

2. Apparatus for opening and cleaning cotton comprising in combination an opening device, a dust cage adjacent thereto, an interconnecting casing between the two, said dust cage adapted to be run at a comparatively high speed, an internal damper in said dust cage, lateral outlet provision for dust and dirty air, suction apparatus connected to said outlet provision, a mouthed conduit in the rear outside the dust cage and in the rear of the internal damper, clean air inlet to the mouthed conduit and suction devices connected with said conduit to carry the opened and cleaned cotton along the conduit in clean air and whereby the suction air through the dust cage carries a thin film of opened cotton over the dust cage, passes out and removes the dirt, while clean air conveys the cotton liberated from the dust cage along the mouthed conduit.

3. Means for opening and cleaning cotton, comprising a revolvable opening device, a dust cage in close proximity thereto, a casing connecting the two, said dust cage adapted to be run at a comparatively high speed and having an adjustable partition located in its interior, side outlets communicating with the interior of the dust cage, suction means connected to said side outlets to draw the dust and dirt laterally of the cage interior, said adjustable partition ensuring liberation of the attenuated cotton disposed about the cage, a mouthed conduit below the partition and exterior to the dust cage, provision for admitting clean air to said conduit, and means for exercising a suction effect upon the mouthed conduit to enable the cotton liberated from the cage by the action of the damper to be carried along the mouthed conduit in clean air, whereby the dust and dirt is withdrawn and permanently removed through a film of cotton disposed about a dust cage which runs at a high speed.

4. Means for opening and cleaning cotton, comprising an opening device, a dust cage working in close proximity thereto, said dust cage being adapted to be run at a relatively high speed, a connecting casing between the opening contrivance and the dust cage, a partition inside the dust cage, connections from the interior of the dust cage to outlets for dust and dirty air, suction provision from said outlets to draw the dust and dirty air laterally of the cage, a closing roller working to the dust cage, a mouthed conduit adjacent the dust cage and below the partition, provision for admitting clean air into said mouthed conduit, suction means in connection with said mouthed conduit and whereby the cotton leaving the dust cage is carried onwards in clean air all to enable the dust and dirty air to be definitely removed from the opened-up film of cotton lying about the dust cage and so that the function of dust removal is separated from the further conveyance of the cotton.

5. Means for opening and cleaning cotton, comprising an opening device, a dust cage adapted to work closely to said opening device, said dust cage being adapted to be run at a relatively high speed, a connecting casing between the opening device and the dust cage, a partition inside the dust cage and dividing the dust cage into compartments, connections from one compartment to outlet provision for dust and dirty air, suction provision connected to said oulets to draw the dust and dirty air laterally of the compartments, clean air inlets to the other compartment in the dust cage, a mouthed conduit below the compartment whereby clean air passes through the said compartment and carries the opened cotton into the mouthed conduit, and suction means connected to the mouthed conduit whereby the opened cotton liberated from the dust cage is carried forward in clean air all whereby the function of dust removal is separated from the subsequent conveyance of the cleaned cotton.

In testimony whereof we have signed our names to this specification.

TOM NUTTALL.
SYDNEY ALFRED SHORTER.